Jan. 3, 1967   R. R. PASINSKI   3,296,607
VEHICLE TACHOMETER INDICATING SYSTEM

Filed May 7, 1965   4 Sheets-Sheet 1

INVENTOR.
BY RALPH R. PASINSKI
WILSON, SETTLE & CRAIG
ATTORNEYS

Jan. 3, 1967  R. R. PASINSKI  3,296,607
VEHICLE TACHOMETER INDICATING SYSTEM
Filed May 7, 1965  4 Sheets-Sheet 2
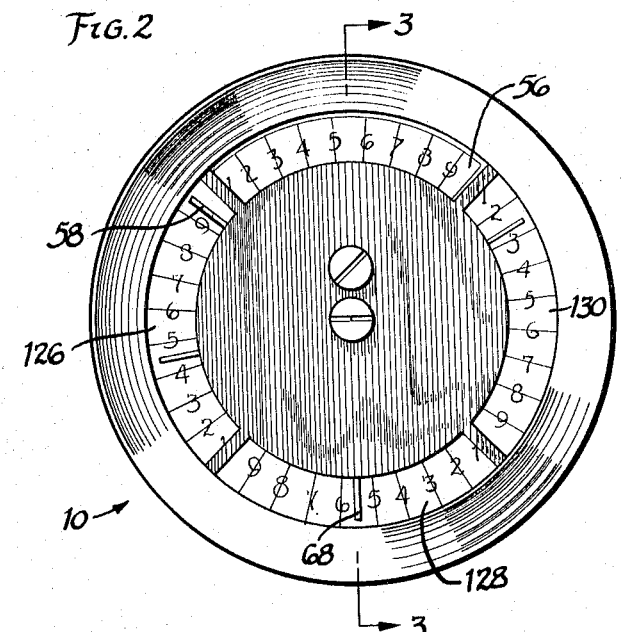
FIG. 2
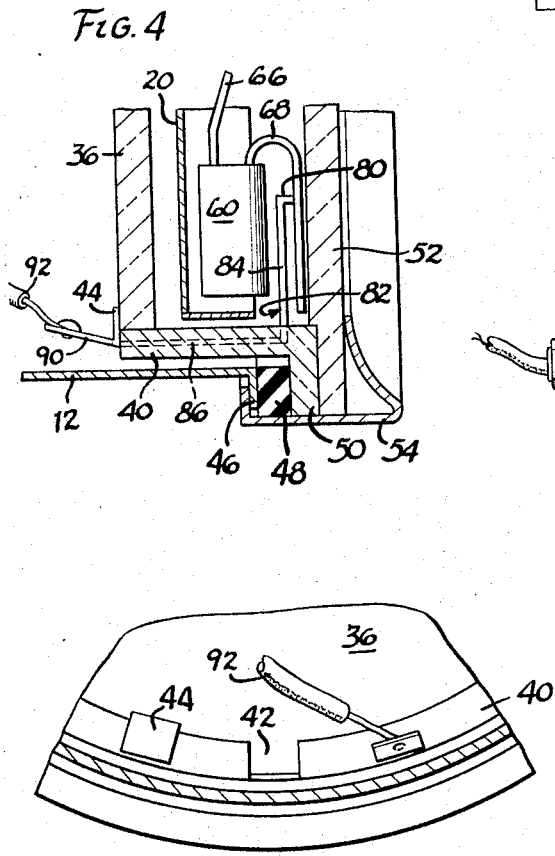
FIG. 4
FIG. 7
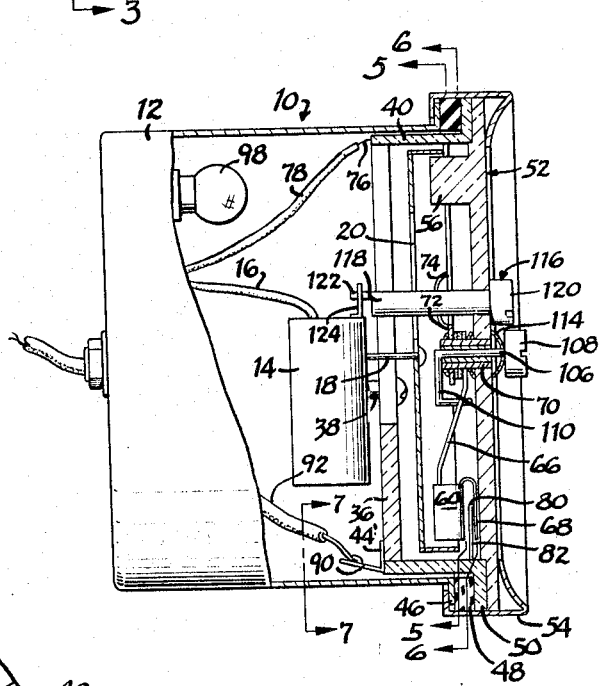
FIG. 3
INVENTOR.
RALPH R. PASINSKI
BY
WILSON, SETTLE & CRAIG
ATTORNEYS Jan. 3, 1967   R. R. PASINSKI   3,296,607
VEHICLE TACHOMETER INDICATING SYSTEM
Filed May 7, 1965   4 Sheets-Sheet 3

INVENTOR.
RALPH R. PASINSKI
BY
WILSON, SETTLE & CRAIG
ATTORNEYS

Jan. 3, 1967  R. R. PASINSKI  3,296,607
VEHICLE TACHOMETER INDICATING SYSTEM
Filed May 7, 1965  4 Sheets-Sheet 4

Inventor.
RALPH R. PASINSKI
By
Wilson, Settle, Batchelder &
Craig
ATT'YS.

United States Patent Office 3,296,607
Patented Jan. 3, 1967

3,296,607
VEHICLE TACHOMETER INDICATING SYSTEM
Ralph R. Pasinski, Detroit, Mich., assignor of one-half to James R. England
Filed May 7, 1965, Ser. No. 457,247
13 Claims. (Cl. 340—263)

This is a continuation-in-part of application Serial No. 300,510, filed August 7, 1963, now patent No. 3,259,572.

The present invention relates to tachometers and more particularly to a tachometer for measuring the rotative speed of internal combustion engines in combination with indicating means for indicating the preferred point at which a particular gear should be shifted.

Tachometers have come into widespread use for sport cars and other high performance vehicles. Tachometers are devices for showing the speed of the engine, normally expressed in crankshaft revolutions per minute. A tachometer has a two-fold function. Firstly, it indicates to the driver the exact r.p.m. range where he can shift without losing any of the horsepower that he has obtained. Secondly, the tachometer acts as a safety device to indicate to a driver the point beyond which he should not continue acceleration in a particular gear because of the danger of breaking a piston and blowing the cylinder block.

As will be appreciated, it is somewhat difficult, when driving at high speed, to concentrate on the road and also on a moving tachometer dial pointer. The present invention provides a tachometer which incorporates a visual light signal to indicate when the point has arrived to shift from a particular gear. This permits the driver to devote almost his entire attention to the road, it only being necessary to observe the visual signalling device by way of peripheral vision.

It is an object of the invention to provide a tachometer which incorporates indicating means for informing a driver the proper point at which to shift gears.

Another object of the invention is to provide such a device in which the indicating means is a lamp.

A further object of the invention is to provide a single indicating element, the single indicating element being operatively connected by means of an electric circuit to the various gears of the vehicle.

Another object of the invention is to provide means on the tachometer for adjusting the signalling point for each gear change to permit exact adjustment of the instrument to suit the particular vehicle in which it is mounted.

A still further object of the invention is to provide a tachometer which has, in addition to the visual light indicating means, a conventional scale which may be utilized in a complementary fashion with the visual light indicating means.

Yet another object of the invention is to provide a tachometer which is simple and inexpensive to manufacture while still being durable in use.

Other objects of this invention will appear in the following description and appended claims, reference being had to the accompanying drawings forming a part of this specification wherein like reference characters designate corresponding parts in the several views.

In the drawings:

FIGURE 2 is a front view of a tachometer constructed in accordance with the present invention;

FIGURE 3 is a sectional view taken substantially along the line 3—3 of FIGURE 2 looking in the direction of the arrows;

FIGURE 4 is an enlarged view of the lower right hand portion of the FIGURE 3 structure;

FIGURE 7 is a sectional view taken substantially along the line 7—7 of FIGURE 3 looking in the direction of the arrows;

Figure 1:
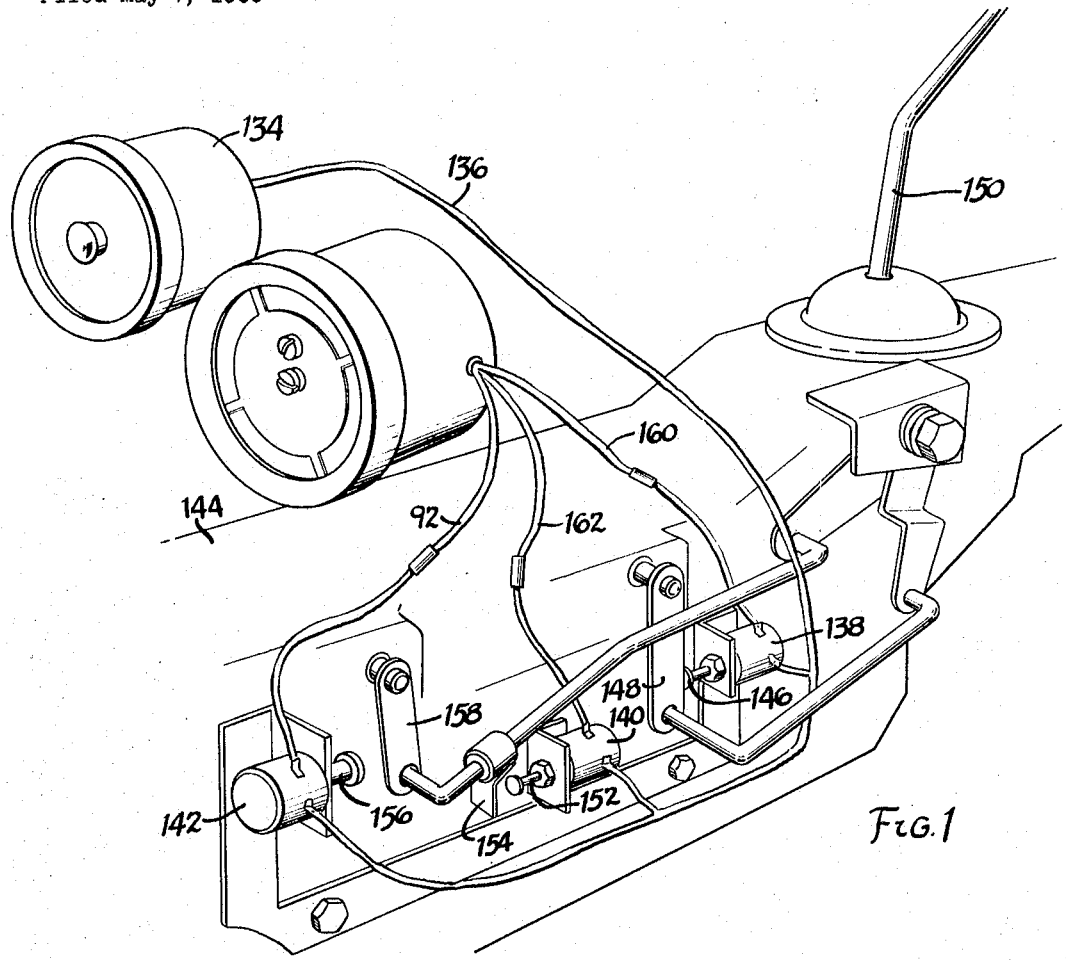
FIGURE 1 is a view in perspective diagrammatically illustrating the connection between the tachometer of the present invention and the gear shifting mechanism of an internal combustion engine.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURES 2–7, it will be noted that the tachometer 10 comprises a cup-shaped casing 12 in which is mounted an electric tachometer mechanism 14. The mechanism 14 is of a conventional nature. The tachometer works on the principle of measuring the number of sparks per minute made in the cylinders of an internal combustion engine. A lead 16 extends from the tachometer mechanism 14 for connection to the ignition system of the vehicle. The ignition circuit provides pulsations of alternating direction, irregular form and of a variable amplitude. The frequency of the pulsations has a direct relation to the speed to be measured. The mechanism 14 includes a transformer which has a primary connected in series with all components of the ignition circuit. The secondary of the transformer is connected in a closed circuit including an A.C. milliammeter adapted to measure current pulses in the closed circuit and show the effective sum thereof. A condenser is connected in series with the milliammeter and means are provided in parallel with the transformer secondary and the condenser-milliammeter series. The latter means comprise a diode having Zener characteristics. The diode is connected to regulate the maximum voltage amplitude applied to the milliammeter to a uniform value for each pulsation in one direction by the Zener characteristic and in the other direction by its forward regulating action. A more detailed description of the type of tachometer mechanism 14 under consideration may be gained by reference to U.S. Patent No. 3,005,155. It is to be noted that while a specific tachometer mechanism is indicated, any operable tachometer mechanism, including both mechanical and electrical devices may be utilized with the present invention.

Extending from the tachometer mechanism 14 is a shaft 18. The shaft 18 is pivoted by the mechanism 14 an angular distance equatable to the speed being measured.

Mounted on the outer end of the shaft 18 is a disc 20. The disc 20 is fixed to the shaft 18 and pivots therewith. As may best be seen in FIGURES 3, 4 and 5, the disc 20 comprises an outer annular member 26 having a plurality of spokes 22 which radiate inwardly and terminate in a hub portion 24 which is connected to the shaft 18. This configuration provides openings 28 for the passage of light past the disc for a purpose to be hereinafter discussed.

A peripheral flange 29 having three openings 30, 32, 34 in spaced ninety degrees apart is provided on the outer periphery of the disc 20. The flange extends outwardly at substantially a right angle to the plane of the shaft and functions, as will be more fully discussed hereinafter, to normally block off the light to the photocells.

The tachometer mechanism 14 is mounted on a circular plate 36 by means of mounting screws 38. The plate 36 is fabricated from a transparent plastic material. The plate 36 is carried on a cylindrical transparent member 40 which is received in the open end of the casing 12. The plate 36 has a plurality of projections 42 extending from the outer periphery thereof and received in mating notches on the inner end of the cylindrical member 40. Metal tabs 44, which are molded into the cylindrical member 40, are bent over to retain the plate 36 in the position shown.

The casing 12 has an annular flange 46 on its open end. The cylindrical member 40 also has an annular flange 50 on its outer end. A gasket 48 is positioned between the flange 46, 50 to seal the open end of the device. A circular lens member 52, which is fabricated from a transparent plastic material, is received on the flange 50 and the entire assembly is held in place by means of a bezel 54.

The lens 52 has an arcuate projection 56 on its inner face which extends towards the disc 20. The disc 20 is divided into four quadrants. The projection 56 extends over substantially one of the quadrants. As will be noted in FIGURE 2, a line 58 is provided on the disc 20 directly beneath the projection 56. The line 58 is viewable through the projection 56. The tachometer mechanism 14 is constructed to pivot the shaft 18 and disc 20 from a zero position through approximately ninety degrees in measuring the speed of an engine. As will be noted in FIGURE 2, numerals ranging from one to nine are provided on the undersurface of the projection 56. These numbers, multiplied by a factor of one thousand, indicate the revolutions per minute of the engine. The tachometer can thus serve in the conventional capacity of a tachometer to indicate to the viewer the exact revolutions per minute of the engine.

Utilization of only one quadrant for direct measurement of the engine speed leaves three quadrants which may be utilized, in accordance with the present invention, for visually signalling the point at which each of the three shifts of a four speed transmission should be made.

The structure for this latter function turns upon the use of three photocells 60, 62, 64. As will be noted in FIGURES 3, 4 and 5, the photocells are mounted directly beneath the lens 52. Each photocell is positioned within one of the three remaining quadrants. Each photocell, illustratively photocell 60, is supported and connected into a control circuit by means of a pair of wire leads 66, 68 as may best be seen in FIGURES 3, 4 and 5. One lead 66 extends from photocell 60 and is wrapped around a metal bushing 70. The bushing 70 is securely mounted in an opening provided in the lens 52. The lens 52 being fabricated from a plastic material, acts as an electrical insulator. The bushing 70 is connected to one side of the circuit by means of a ring 72 which is mounted thereon. Extending from the ring 72 is a strip of metal 74. The strip 74 extends to the cylindrical member 40 and has a downwardly extending portion which is molded into the cylinder 40. A portion 76 of the strip 74 extends outwardly of the inner end of the cylindrical member 40. Lead 78 is attached to the portion 76. Lead 78 extends from the casing 12 into eventual connection with one side of the circuit.

Photocell 60 is connected to the other side of the circuit by means of the lead 68. As will be noted, the lead 68 is bent towards the outer periphery of the casing and slidingly contacts a flange 80 of an electrical conductor 82. The conductor 82, as may best be seen in FIGURES 4 and 6, includes an arcuate portion 84 which extends radially inwardly from the cylindrical member 40. The portion 84 covers substantially one quadrant of the tachometer. The aforementioned flange 80 extends outwardly from the inner end of the portion 84 for sliding contact with the lead 68. The portion 84 has, at each end, elongated strips 86, 88 which extend right angularly thereto and are molded into the wall of the cylinder 40. The strips 86, 88 extend a distance past the inner end of the cylindrical member 40. One of the strips is bent to form the previously mentioned tab 44 for supporting the plate 36. The extending portion 90 of the other strip is utilized as an electrical connection for a lead 92. The lead 92 extends from the casing 12 into eventual connection with the circuit to thus complete a circuit through the photocell 60. A similar configuration in the form of conductors 94, 96 is provided for the other two photocells 62, 64.

The interior of the casing 12 is flooded with light by means of a lamp 98. The lamp 98 is suitably connected to power and is always energized when the ignition system is closed. Light from the lamp 98 will impinge upon the light receiving ends 100, 102, 104 of the photocells 60, 62, 64 when the openings 30, 32, 34 are moved to a position in registry therewith. The photocells are of the type termed "photovoltaic." A photovoltaic cell is a semiconductor device that converts light energy into electrical energy. An outside voltage is unnecessary because it is a self-generating device. In the circuitry of the invention, this characteristic of the photocells is utilized to actuate an indicator lamp at the specified speed for each gear change.

The tachometer as illustrated is adapted for use in connection with a four-speed transmission. In a four-speed transmission, there are three gear shifts at which the engine speed is of concern. The first gear shift of concern is when the transmission is shifted from the first gear to the second gear. Photocell 62 is utilized to indicate the point for this gear shift. The second gear shift is from second to third. Photocell 60 is utilized in connection with this shift. The third gear shift is from third to fourth. Photocell 64 is utilized for this shift.

Figure 5:
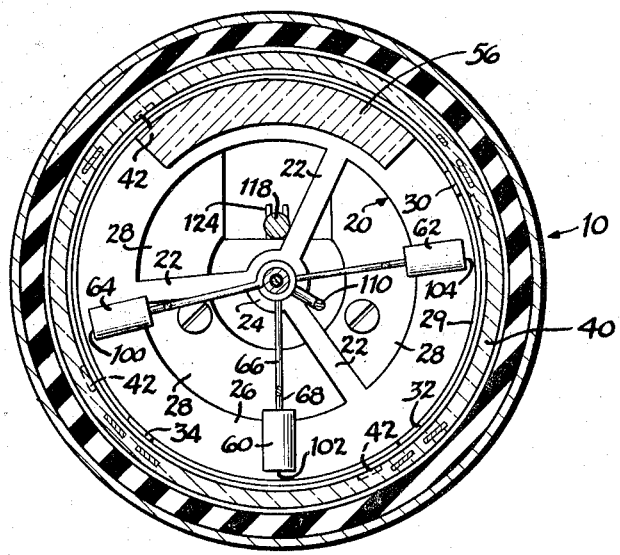
FIGURE 5 is a sectional view taken substantially along the line 5—5 of FIGURE 3 looking in the direction of the arrows.

Operation of the device in connection with shifting from second to third will be described. The other two shifts are controlled in substantially the same manner. Referring to FIGURES 3 and 5, it will be noted that the opening 32 of the disc 20 passes in front of the end 102 of the photocell 60 when the disc has been pivoted a distance equal to the r.p.m. range at which the shift should take place. It will be noted in FIGURE 5 that the opening 32 is spaced from the photocell 60 when the device is at rest. This distance may be varied by adjusting the photocell 60 to a position closer to or further from the opening 32.

The means for adjusting the photocells is illustrated in FIGURE 3. As will be noted, a shaft 106 extends through the bushing 70. The shaft 106 has a slotted head 108 to facilitate turning by a screwdriver. A hook 110 is provided on the inner end of the shaft to engage the lead 66 of the photocell 60. Consequently, turning of the shaft will result in pivoting the lead 66 on the bushing 70 to shift the photocell to the desired angular relationship with respect to the opening 32. The lead 68 of the photocell slides on the flange 80 and thus always maintains the electrical circuit regardless of such shifting.

The photocell 60 may be pivoted in the opposite direction and the other two photocells 62, 64 may be adjusted by depression of the shaft 106 so that the hook 110 will clear the lead 66. As will be noted, bevel spring washer 114, normally bias the shaft 106 to the position shown. The shaft may be depressed against the action of the spring washer to permit adjustment of all of the photocells.

A second adjustment member 116 is provided to adjust the tachometer mechanism 14. The member 116 comprises the shaft 118 which extends through the lens 52. A slotted head 120 is provided for engagement by screwdriver to rotate the shaft 118. The shaft 118 carries at its inner end a cam member 122 which extends into a pivotal fork member 124 (FIGURES 3 and 5) on the mechanism 14. The member 124 is connected to the shaft 18. Thus, pivoting of the shaft 118 is effective via the cam 122, to pivot the disc 20. Such pivoting is desired to adjust the mechanism to the zero position.

Each quadrant of the lens 52 is, in essence, a full range tachometer. As will be noted in FIGURE 2, each quadrant has a set of numerals from one to nine. The openings 30, 32, 34 of the disc 20 are fixedly located at the zero position. The photocells may be set to the desired r.p.m. point by the adjusting mechanism above-discussed. The lead 68 is visible through the lens 52 and serves as an indicator line for setting the photocell. The lens 52 is preferably coated with an opaque material so that only the lens projection 56 and the portions 126, 128, 130 are transparent.

Figure 8:
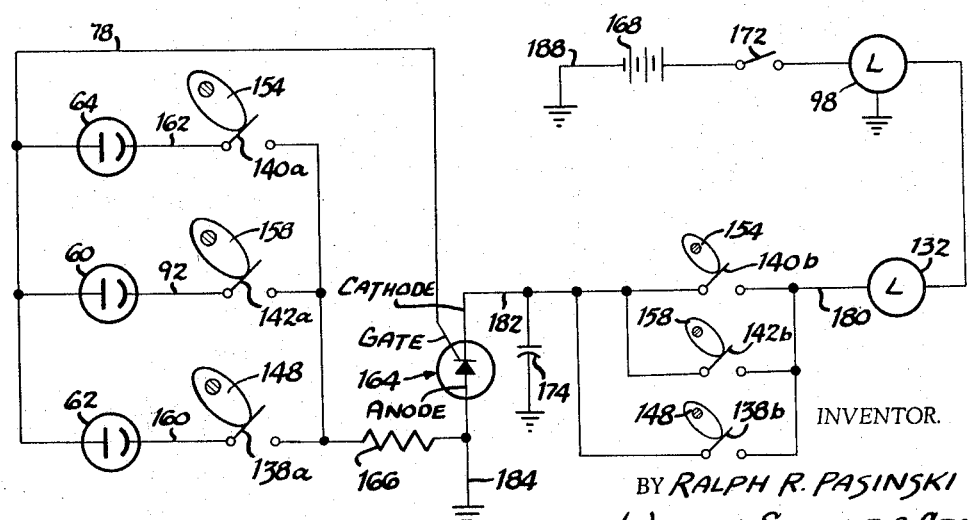
FIGURE 8 is a schematic illustration of the electrical circuitry of the tachometer as mounted in a vehicle.
Figure 6:
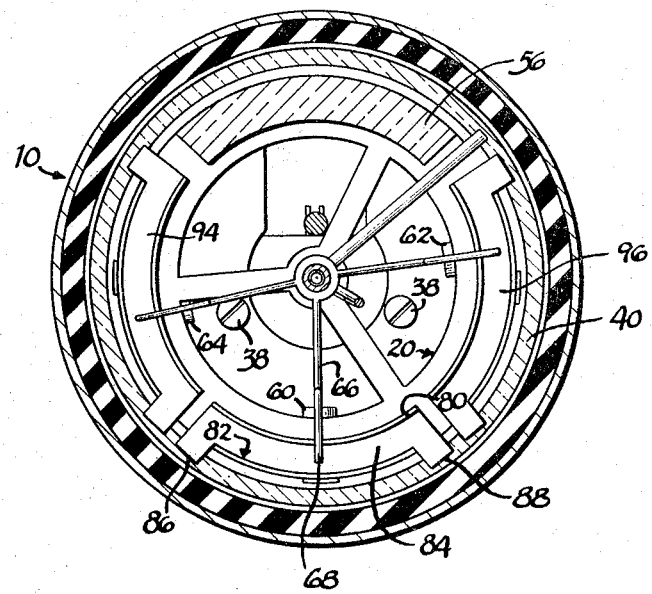
FIGURE 6 is a sectional view taken substantially along the line 6—6 of FIGURE 3 looking in the direction of the arrows.

Referring now to FIGURES 1, 3 and 8, the electrical circuitry for accomplishing the desired visual indication will be apparent. As will be noted in FIGURES 1 and 8, an indicating lamp 132 is provided in a housing 134. This lamp may be conveniently mounted on the dashboard of the vehicle. A lamp is preferred rather than an audible noise such as a buzz because the engine noise will frequently drown out a warning buzz. A lead 136 extends from the lamp 132 into parallel connection with a set of contacts of each of three normally open spring urged switches 138, 140, 142. The switches 138, 140, 142 each have two sets of normally open contacts.

These switches are mounted on the transmission 144 in position to be actuated to the closed position by movement of the gear shifting linkage. Switch 138 has a spring urged plunger 146 which is depressed by a cam 148 to close the switch. Cam member 148 is moved by shifting the gear lever 150 into first. The switch 140 has a spring urged plunger 152 which is actuated by a cam 154 to close the switch when the gear lever 150 is moved into third gear. The switch 142 has a spring urged plunger 156 which is depressed by cam 158 to close the switch when the gear lever 150 is moved into the second gear position. Leads 92, 160, 162 extend from the photocells 60, 62, 64 into connection with one set of contacts of the switches 138, 140, 142. It will thus be appreciated that switch 138 will be closed when the transmission is in the first position. Switch 140 will be closed when the transmission is in the third position and switch 142 will be closed when the transmission is in the second position.

The complete electrical circuitry for energizing the lamp 132 is illustrated in FIGURE 8. As will be noted, the circuit includes a solid state controlled rectifier 164 having a gate, cathode and anode. The gate-cathode circuit includes the three photocells 60, 62, 64 arranged in parallel, each photocell having in series therewith a set of contacts 138a, 140a, 142a of the respective switches. The gate-cathode circuit also includes a load limiting resistor 166. The gate-cathode circuit provides the excitation or triggering signal for the controlled rectifier 164.

The anode-cathode circuit of the rectifier 164 completes a circuit through the lamp 132. Power to operate the lamp is obtained from the vehicle battery 168. The normally open ignition switch 172 is provided in series with the battery 168. This switch must be closed before the device will operate.

The controlled rectifier 164 is a solid state device, for example, a silicon controlled rectifier, having both an "on" and an "off" state. The gate or switching current required is but a fraction of the total current carrying capability of the rectifier. The rectifier is illustrated as a PNPN type. The operation of this rectifier may be compared to that of an NPN transistor directly coupled to a PNP transistor, where the base current of the NPN transistor is synonymous with gate current in the controlled rectifier.

The second set of contacts 138b, 140b, 142b of the switches 138, 140, 142 are arranged in parallel and placed in the anode-cathode circuit of the rectifier. The lamp 132 is also provided in this circuit. A grounded capacitor 174 is provided to prevent the occurrence of high voltages upon opening of the anode-cathode circuit.

Operation of the circuit will be described in connection with the situation where the transmission is in first gear. When the transmission is in first gear, the switch 138 is closed. Thus, contacts 138a and 138b are closed. When the opening 30 moves to a position in front of the photocell 62, this photocell will develop a voltage causing a current to flow in the gate-cathode circuit of the rectifier 164. This current triggers the rectifier to the "on" condition. A relatively large current will then flow from ground through lead 184 through the anode-cathode circuit of the rectifier, thence through lead 182, closed contact 138b, thence through lead 136, lamp 132, switch 172 to battery 168 and thence via lead 188 to ground. Closure of this circuit thus energizes the lamp 132 and apprises the driver that it is time to shift into second gear. The rectifier 164 will continue to conduct and the lamp 132 will remain lighted until the gear change is effected. As soon as the opening 30 passes by the photocell 62, the photocell will be de-energized. However, this will not turn the rectifier 164 to the "off" condition. Once triggered to the "on" condition, the rectifier will conduct until the gears are shifted to open the contact 138b. As soon as the gear shift is effected, the contacts of switch 138 will open, opening the circuit through the lamp 132. The contacts 138b, 140b, 142b may be eliminated and the rectifier 164 replaced with a conventional transistor. With this arrangement the lamp 132 will go off as soon as the photocells are de-energized. Energization of the photocells for a time sufficient to keep the lamp 132 energized a long enough time to apprise the driver of the need to change may be accomplished by enlarging the openings 30, 32, 34.

The remaining two circuits through the contacts of switches 140 and 142 for shifting into third and fourth are substantially the same as the above-described circuits used in connection with shifting from first to second.

Figure 10:
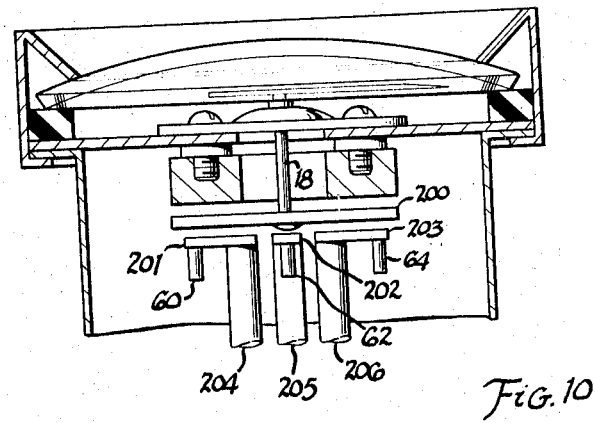
FIGURE 10 is a sectional view taken on the line 10—10 of FIGURE 9 looking in the direction of the arrows.
Figure 9:
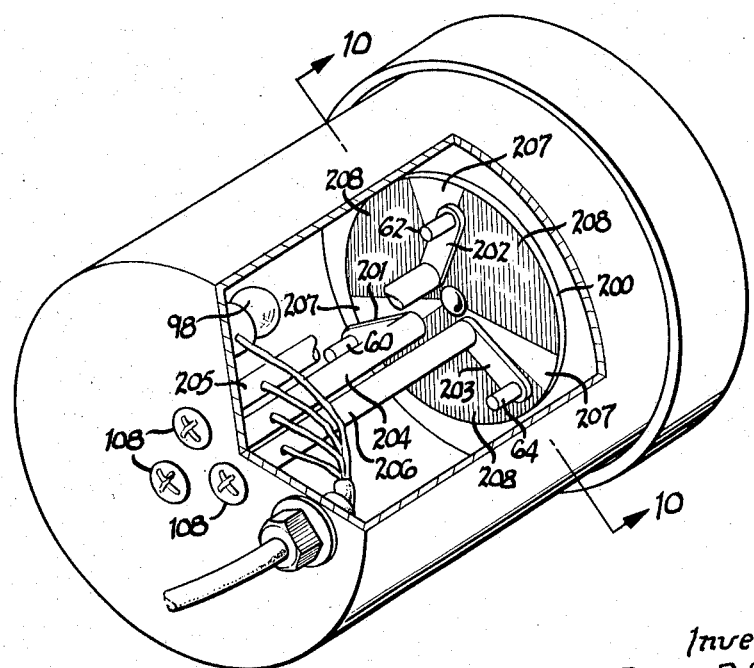
FIGURE 9 is a perspective view of a further embodiment of the invention with part of the casing of the device cut away.

In principle the device shown in FIGURES 9 and 10 is very similar in many respects to that shown in FIGURES 1 to 8 and similar reference numerals are used for similar parts.

In FIGURES 9 and 10 the shaft 18 extends rearwardly and carries a disc 200 having alternating light reflecting sectors 207 and non-reflecting sectors 208. The non-reflecting sectors 208 extend over an area subtending an angle which represents a predetermined r.p.m. range. The angle shown is 90°. However, this may be varied depending upon the particular instrument under consideration. The neighboring associated light reflecting sectors 207 extend over an area subtending an angle which is determined in a manner to be later described.

The photocells 60, 62 and 64 are spaced a short distance from the surface of the disc 200 and it will readily be apparent that light from the lamp 98 is either reflected or not reflected to a photocell depending on whether the surface opposite the photocell is reflecting or non-reflecting.

The photocells 60, 62 and 64 are mounted on arms 201, 202 and 203 respectively which in turn are fixedly connected to rods 204, 205 and 206. The rods can be turned by slotted heads, e.g. head 108, to cause the photocells, e.g. photocell 60, to be repositioned relative to the reflecting and non-reflecting areas in a similar way to that described in relation to the adjustment of the photocells of FIGURES 1 to 8 relative to their associated openings 30, 32 and 34.

Thus a photocell will be over a non-reflecting area when the engine is revolving slowly, but as the r.p.m. increases the disc will move until the photocell is overlying the reflecting area whereupon the photocell will develop a voltage utilized as described in relation to FIGURES 1 to 8.

The circuitry can equally well be arranged in the devices shown in FIGURES 1 to 8, and 9 and 10 so that the triggering of the operation of the signal means occurs upon either energization or de-energization of the photocell, in other words, upon a change in the condition of energization of the photocell.

The number of pairs of reflecting and non-reflecting sectors is determined by the number of indicating operations to be performed by the device. The total angle for each pair of sectors is thus determined by dividing 360° by the total number of pairs.

The total angle for each non-reflecting sector is equal to the maximum angle through which the shaft 18 is designed to turn, in other words, the full range of the tachometer. This implies that the tachometer range must be designed to correlate with the number of indicating operations to be performed.

The total angle for each reflecting sector is thus equal to the total angle of a pair of sectors minus the angle of the non-reflecting sector.

In the embodiment illustrated, there are three indicating operations to be performed. Thus the total angle of each pair of sectors equals 120°. The tachometer has a full range of 90°. Thus the angle of the reflecting sectors is 30°

It will be appreciated that the indicating technique illustrated may be used for control devices other than tachometers.

In essence, the control device illustrated provides a control signal in response to each situation of a group of related situations. In the case of the tachometer, each situation consists of the r.p.m. for each gear ratio. These situations are related with reference to driving the vehicle. A similar problem would be, for example, heat treating a metallic article in which the article must be subjected to successive different temperatures.

Having thus described my invention, I claim:

1. A device for indicating the rotative speed at which the gears of an internal combustion engine should be shifted comprising a tachometer for indicating the rotative speed of the engine, said tachometer having an output shaft which pivots an amount calibrated to the engine speed, a photocell, means carried on the shaft to trigger the photocell at a given engine speed, normally open switch means in series with the photocell and actuated to close by the vehicle gear in one operative position thereof, indicating means, said indicating means being energized upon triggering of the photocell and closure of the switch means.

2. A device for indicating the rotative speed at which the gears of an engine driven vehicle should be shifted, said vehicle having a transmission with a plurality of gear settings, comprising a tachometer for registering the rotative engine speed, said tachometer having an output shaft, the tachometer being responsive to engine speed to pivot the shaft and extent equated to the engine speed, a photocell for each gear-shift position, means carried on the shaft to trigger each photocell at a given engine speed, separate normally open switch means in series with each photocell, each switch means being actuated to close in one gear setting, indicating means, said indicating means being energized upon triggering of one of the photocells and closure of its associated switch means.

3. A device for indicating the speed at which the gears of an engine driven vehicle should be shifted, said vehicle having a transmission with a plurality of gear settings, comprising a tachometer for registering the rotative engine speed, said tachometer having an output shaft, the tachometer being responsive to engine speed to pivot the shaft an extent equated to the engine speed, a photocell for each gear setting, means carried on the shaft to trigger each photocell at a given engine speed, separate normally open switch means in series with each photocell, each switch means being actuated to close in one gear setting, indicating means, said indicating means being energized upon triggering of one of the photocells and closure of its associated switch means, and means to maintain energization of the indicating means until the vehicle gear has been shifted to a new gear setting.

4. A device for indicating the speed at which the gears of an engine driven vehicle should be shifted, said vehicle having a transmission with a plurality of gear settings, comprising a tachometer for registering the rotative engine speed, said tachometer having an output shaft, the tachometer being responsive to engine speed to pivot the shaft an extent equated to the engine speed, a photocell for each gear-shift position, means carried on the shaft to trigger each photocell at a given engine speed, adjustment means for the photocells for positioning the photocells in different locations with respect to the means for energizing the photocells, separate normally open switch means in series with each photocell, each switch means being actuated to close in one gear setting, indicating means, said indicating means being energized upon triggering of one of the photocells and closure of its associated switch means.

5. A device for indicating the speed at which the gears of an engine driven vehicle should be shifted, said vehicle having a transmission with a plurality of gear settings, comprising a tachometer for registering the rotative engine speed, said tachometer having an output shaft, the tachometer being responsive to engine speed to pivot the shaft an extent equated to engine speed, a casing, a photocell for each gear-shift position positioned within the casing, a light source within the casing to flood the casing interior with light, means carried on the shaft to effect the amount of light received by each photocell and trigger the photocell at a given engine speed, separate normally open switch means in series with each photocell, each switch means being actuated to close in one gear setting, indicating means, said indicating means being energized upon triggering of one of the photocells and closure of its associated switch means.

6. A device for indicating the speed at which the gears of an engine driven vehicle should be shifted, said vehicle having a transmission with a plurality of gear settings, comprising a casing having a transparent wall, a tachometer mounted within the casing for registering the rotative engine speed, said tachometer having an output shaft, the tachometer being responsive to engine speed to pivot the shaft an extent equated to the engine speed, a photocell for each gear-shift position, said photocells being visible through the transparent wall, means carried on the shaft to trigger each photocell at a given engine speed, means accessible exteriorly of the casing for adjusting the photocells to different positions with respect to the means on the shaft for triggering the photocells, the exterior surface of the transparent wall being calibrated for each photocell to indicate the engine speed at which the photocell will be triggered, separate normally open switch means in series with each photocell, each switch means being actuated to close in one gear setting, indicating means, said indicating means being energized upon triggering of one of the photocells and closure of its associated switch means.

7. The device of claim 6 and further characterized in that said photocell adjusting means comprises an electrically conductive element in the casing, each of the photocells having a conductor which is rotatably connected and electrically in contact with said electrically conductive member, a lead connecting said electrically conductive member to one side of the associated normally open switch means, a manually rotatable element in the casing and extending exteriorly of the casing through the transparent wall, said manually rotatable element having a hook portion on its inner end for engagement with one of the conductors of one of the photocells for moving the photocells to different adjusted positions, said manually rotatable element being depressible to avoid contact with the photocell conductive elements for rotation to a position for adjusting a selected one of the photocells.

8. A device as claimed in claim 7 and further characterized in that each of the photocells has a second electrically conductive element, an electrically conductive element within the casing for connecting the photocell to the other side of the associated normally open switch means, said second electrically conductive element of the photocells being in sliding contact with said other electrically conductive element to make contact therewith in all of its adjusted positions.

9. A device for indicating the speed at which the gears of an engine driven vehicle should be shifted, said vehicle having a transmission with a plurality of gear settings, comprising a casing, a tachometer for registering the rotative engine speed, said tachometer having an output shaft, the tachometer being responsive to engine speed to pivot the shaft an extent equated to the engine speed, the maximum pivoting of the shaft being less than half of a full revolution to provide a plurality of full range indicator sectors in a theoretical circle, a photocell for each gear-shift position, said photocells being spaced circumferentially around the shaft, each photocell being in a different full range sector, a light source within the casing, a disc carried on the shaft, said disc having a peripheral flange with plurality of circumferentially spaced openings thereon, said flange being positioned to intervene between the photocells and the light source, each of said openings being positioned to permit light to impinge upon one of the photocells at a given engine speed whereby to energize the photocell, separate normally open switch means in series with each photocell, each switch means being actuated to close in one gear setting, indicating means, said indicating means being energized upon energization of one of the photocells and closure of its associated switch means.

10. A device for indicating the speed at which the gears of an engine driven vehicle should be shifted, said vehicle having a transmission with a plurality of gear settings, comprising a tachometer for registering the engine speed, said tachometer having an output shaft, the tachometer being responsive to engine speed to pivot the shaft an extent equated to the engine speed, a photocell for each gear-shift position, a disc carried by the shaft, said disc having alternate light and dark associated sectors, a pair of light and dark sectors being provided for each photocell, a source of light impinging on the disc, each photocell being positioned with respect to its pair of sectors to receive reflected light from the light sector and be energized thereby at a given engine speed, separate normally open switch means in series with each photocell, each switch means being actuated to close in one gear setting, indicating means, said indicating means being energized upo triggering one of the photocells and closure of its associated switch means.

11. A device for indicating the speed at which gears of an engine driven vehicle should be shifted, said vehicle having a transmission with a plurality of gear settings, comprising a tachometer for registering the engine speed, said tachometer having an output shaft, the tachometer being responsive to engine speed to pivot the shaft an extent equated to the engine speed, a casing, a photocell for each gear-shift position, a disc carried by the shaft, said disc having alternate light and dark associated sectors, a pair of light and dark sectors being provided for each photocell, a light source within the casing to flood the casing interior with light, each photocell being positioned with respect to its pair of sectors to receive reflected light from its light segment and be energized thereby at a given engine speed, separate normally open switch means in series with each photocell, each switch means being actuated to close in one gear setting, indicating means, said indicating means being energized upon triggering of one of the photocells and closure of its associated switch means.

12. A control device for providing a control signal in response to each situation of a group of related situations, comprising a disc, said disc being divided into pairs of alternate light and dark sectors, each pair of sectors being associated with one of the situations, means to pivot the disc about its center an extent equated to the state of a situation, a photocell for each situation, a source of light impinging on the disc, each photocell being positioned with respect to its pair of sectors to receive reflected light from its light sector and be energized thereby when the light sector is in a predetermined position and be de-energized when its dark sector is in a predetermined position, separate normally open switch means in series with each photocell, each switch means being actuated to close during the pendency of one situation, control signalling means associated with each photocell, said control signalling means being energized upon triggering of one of the photocells and closure of its associated switch means.

13. A device for indicating the speed at which the gears of an engine driven vehicle should be shifted, said vehicle having a transmission with a plurality of gear settings, a gear lever having associated linkage for operating the transmission to different gear gettings, comprising a tachometer for registering the rotation engine speed, an electrical circuit including a first electrical switch means for each gear setting, said tachometer having triggering means for closing each first electrical switch means at a given engine speed, a second normally open electrical switch means in series with each first electrical switch means, actuating means connecting to the gear lever with associated linkage operative to actuate one of the second switch means to a closed position in each gear setting, indicating means, said indicating means being energized upon closure of a circuit through one of the first electrical switch means and its associated second electrical switch means.

No references cited.

NEIL C. READ, *Primary Examiner.*

A. H. WARING, *Assistant Examiner.*